United States Patent
Furusawa et al.

[19]

[11] Patent Number: 5,870,359
[45] Date of Patent: Feb. 9, 1999

[54] DISC HOLDER FOR A DISC REPRODUCING DEVICE

[75] Inventors: Shigeharu Furusawa; Yoshimitsu Fukushima; Satoru Anada, all of Saitama-ken, Japan

[73] Assignee: Pioneer Electronic Corp., Saitama-ken, Japan

[21] Appl. No.: 763,403

[22] Filed: Dec. 11, 1996

[30] Foreign Application Priority Data

Dec. 14, 1995 [JP] Japan .................................... 7-347425

[51] Int. Cl.$^6$ .......................... G11B 33/02; G11B 17/04; G11B 17/22
[52] U.S. Cl. ............................. 369/36; 369/75.1; 369/178
[58] Field of Search .................. 369/36, 37, 38, 369/39, 75.1, 178, 191, 192; 360/98.04, 98.06

[56] References Cited

U.S. PATENT DOCUMENTS 4,567,584   1/1986   Kawakami .................. 369/38
4,599,716   7/1986   Shimbo ...................... 369/36
4,601,026   7/1986   Kawakami .................. 369/38
4,633,452  12/1986   Shimbo et al. ............. 369/39
5,550,801   8/1996   Enomoto et al. .......... 369/178

FOREIGN PATENT DOCUMENTS 967990  12/1957   Germany .

*Primary Examiner*—William J. Klimowicz
*Attorney, Agent, or Firm*—Nikaido Marmelstein Murray & Oram, LLP

[57] ABSTRACT

A disc holder has a support portion comprising arcuated portions. The arcuated portions include opposite upper portions the curvature of which is substantially equal to that of a larger disc, and opposite lower portions the curvature of which is substantially equal to that of a smaller disc. Thus, the larger disc is held by the upper portions, and the smaller disc is held by the lower portions.

4 Claims, 14 Drawing Sheets

DISC HOLDER FOR A DISC REPRODUCING DEVICE

BACKGROUND OF THE INVENTION

The present invention relates to a disc holder provided in a device for reproducing a disc.

There is known a conventional device for reproducing a disc held in a disc holder wherein several tens of discs are stored, and a desired disc is picked by an automatic disc changer so as to be reproduced. The discs are disposed in a compact manner without taking up much space, so that the capacity of each holder can be decreased.

Referring to FIG. 17, a conventional disc reproducing device having an automatic disc changer comprises a casing 101, and a door 110 provided in front of the casing 101. In the casing 101, a disc player 200 having a disc loading arm 220, and a plurality of disc holders 300 are provided. The disc player 200 is movably mounted in the casing along the holders 300 disposed in the horizontal direction, that is, in directions shown by arrows A.

Referring to FIG. 18, in the holders 300 are stored a plurality of vertically disposed discs 310 in a horizontal arrangement, each in a space divided by partitions (not shown). The disc player 200 slides in parallel to the axial direction of the discs 310 as shown by the arrow A, so as to confront the disc selected to be played. The loading arm 220 is downwardly rotated, so as to engage one the selected disc and urges the disc into the disc player 200.

When the door 110 of the casing 100 is opened as shown in FIG. 17, the disc holder 300 can be rotated about connecting pins 302 in directions shown by arrows B to be exposed from the casing. Thus, the disc 310 in any of the holders 300 except the one in which a disc is moved, or reproduced, can be easily taken out from the casing to be changed.

Referring to FIGS. 19a and 19b showing the holder 300 in section, the holder 300 has a plurality of partitions 300a, thereby forming a plurality of parallel grooves 300b extending in the lateral direction of the holder 300. In each groove 300b, there is inserted a twelve-centimeter disc 310a as shown in FIG. 19a, or an eight-centimeter disc 310b as shown in FIG. 19b. The bottom of the groove 300b is so designed as to form an arc, the curvature of which coincides with that of the periphery of the twelve-centimeter disc 310a. If the twelve-centimeter disc 310a is stored in the groove 300b, a relatively large portion of the lower periphery thereof makes a contact with the bottom of the groove 300b so that the disc 310a is stably held therein.

On the other hand, as shown in FIG. 19b, since the eight-centimeter disc 310b has a larger curvature than that of the groove 300b, a smaller peripheral portion of the disc 310b rests on the bottom surface. More particularly, when exchanging the disc, the holder 300 is rotated so as to carry the disc outside the casing 101 as shown in FIG. 20a. After a new disc is put in, the holder 300 is rotated back in the opposite direction to the position of FIG. 20b. During the operation, the new disc 310b rolls back and forth due to the dead weight thereof. Hence it takes a while for the eight-centimeter disc 310b to stop at the predetermined position in the groove 300b. If the disc player 200 is horizontally moved to pick out another disc while the eight-centimeter disc is still rotating, the player 200 and the disc may collide, thereby damaging the disc. Hence the player 200 must wait for the disc to stop moving before starting to move for picking out a disc. As a result, the reproduction of the discs cannot be quickly operated.

SUMMARY OF THE INVENTION

An object of the present invention is to provide a disc holder for an automatic disc reproducing device wherein the discs of different sizes can be stably held in the holder, thereby enabling to quickly proceed with an operation of selecting the disc to be played.

According to the present invention, there is provided a disc holding device for a disc reproducing device having a disc holder wherein a plurality of discs are horizontally arranged, each in a vertical disposition between opposite partitions, a disc player provided to be moved in parallel to an axial direction of the discs, and a loading device for taking out one of the discs from the disc holder and loading it on the disc player.

The disc holder comprises a support portion having arcuated portions. The arcuated portions include opposite upper portions the curvature of which is substantially equal to that of a larger disc, and opposite lower portions the curvature of which is substantially equal to that of a smaller disc. Thus, the larger disc is held by the upper portions, and the smaller disc is held by the lower portions.

The disc holder has an opening at a bottom thereof, and the upper portion and the lower portion of each side of the disc holder are continuously formed at a junction thereof.

These and other objects and features of the present invention will become more apparent from the following detailed description with reference to the accompanying drawings.

DETAILED DESCRIPTION OF THE PREFERRED EMBODIMENT

Figure 1:
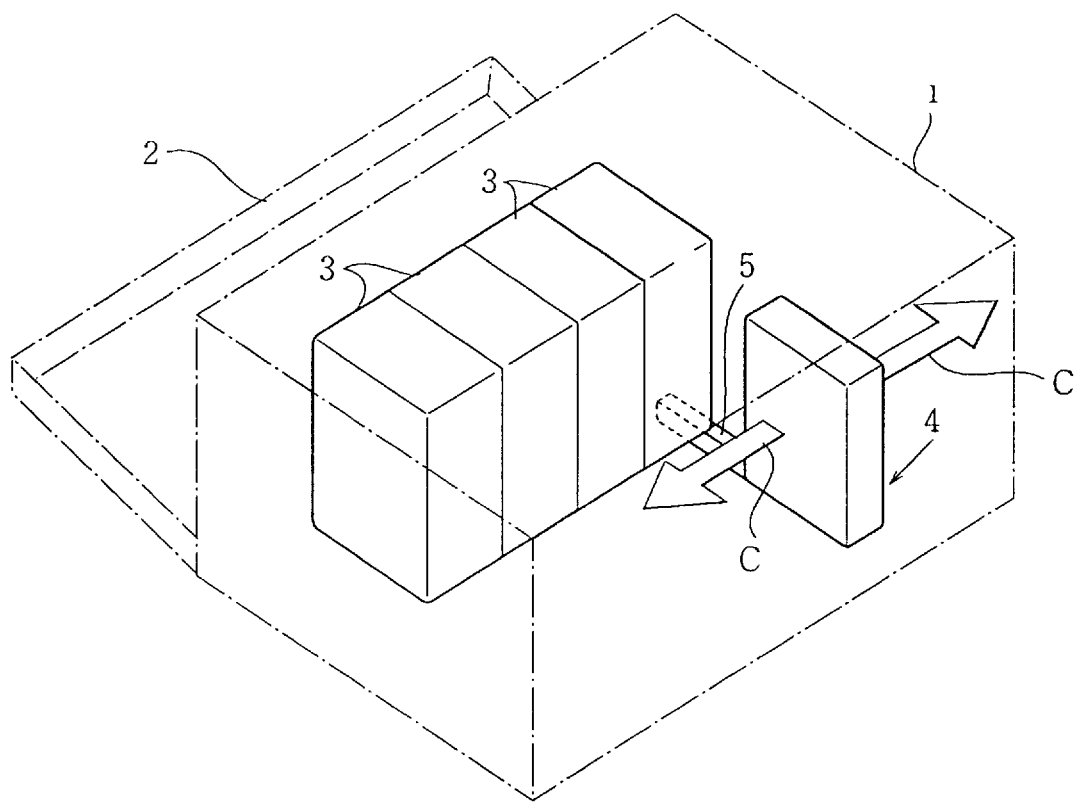
FIG. 1 is a schematic perspective view of a disc reproducing device to which the present invention is applied.

Referring to FIG. 1, a disc reproducing device to which the present invention is applied, comprises a casing 1 in which a plurality of disc holders 3 are longitudinally aligned. Each holder 3 stores a plurality of twelve-centimeter or eight-centimeter CDs vertically disposed therein. The casing 1 is provided with a door 2 at the front side thereof so as to allow the disc in the holder 3 to be pulled out and exchanged for another.

A disc player 4 having a loading arm 5 is disposed adjacent the holders 3, confronting the discs. The disc player 4 is movable in an aligning direction of the holders 3 as shown by arrows C to a position in front of a selected disc. The loading arm 5 engages the disc and loads it into the player 4. Hence the disc is played.

Figure 2:
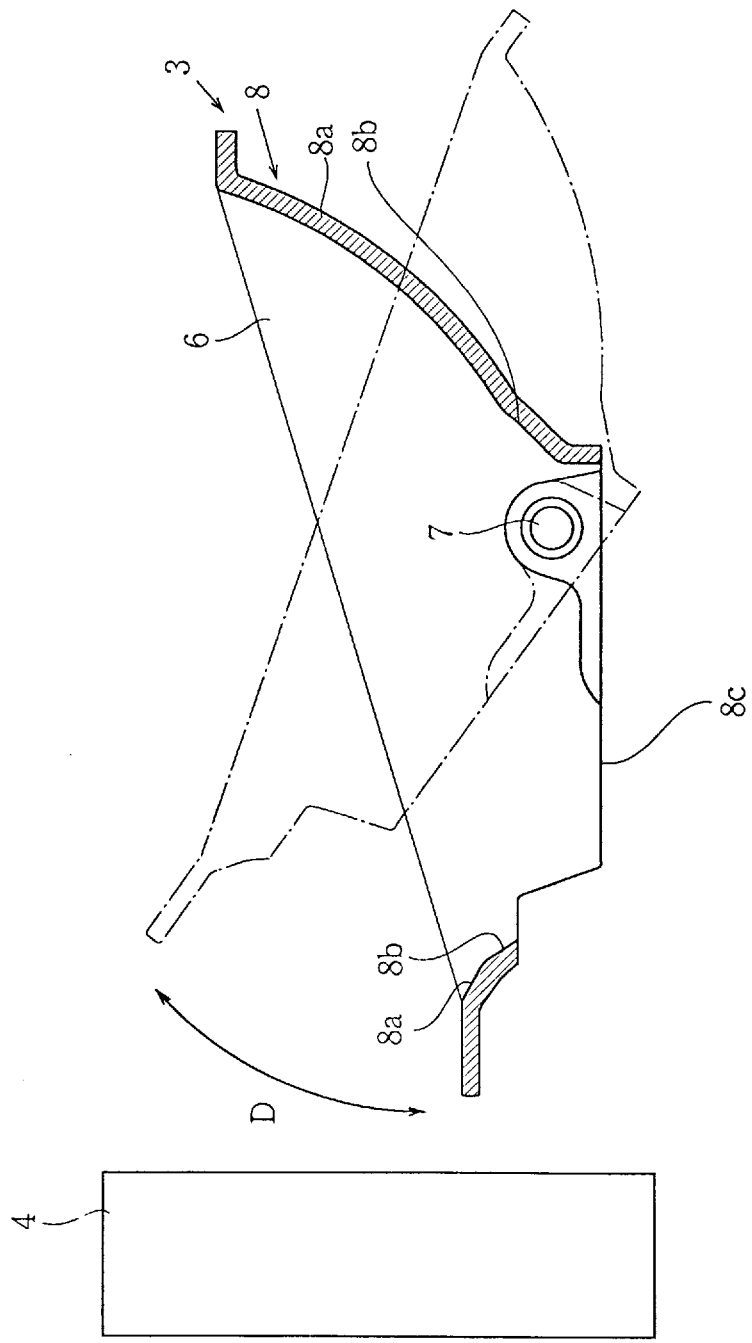
FIG. 2 is a sectional view of a disc holder according to the present invention, provided in the disc reproducing device of FIG. 1.

Referring to FIG. 2, the disc holder 3 comprises arcuated portions forming a semicircular support portion 8 having an opening 8c at the bottom. The disc holder 3 is rotatably mounted on connecting pins 7 so as to be manually or electrically rotated in directions shown by arrows D to a disc exchanging position indicated by a dot-dash line. Hence the upper portion of the holder 3 faces the door 2 of the casing 1 so that upon opening of the door 2, the discs in the holder 3 can be taken out. The support portion 8 has opposite upper portions 8a which conform to the circumference of a twelve-centimeter disc and opposite lower portions 8b integral with the upper portions 8a, which conform to the circumference of an eight-centimeter disc. The disc support 8 is provided with a plurality of vertical partitions 6 extended between the front and rear periphery of the support 8. Each disc is held in a groove formed between the adjacent partitions 6 and supported by the upper portion 8a or the lower portion 8b at the front lower periphery and the rear lower periphery, respectively.

Figure 3:
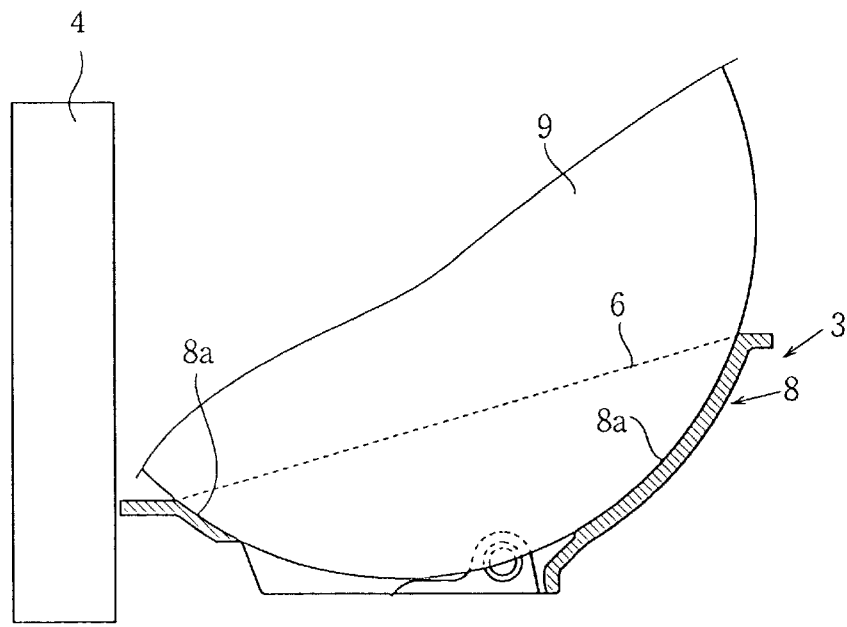
FIG. 3a and 3b are schematic sectional views of the disc holder in a disc storing position, holding a twelve-centimeter disc and an eight-centimeter disc, respectively.
Figure 3:
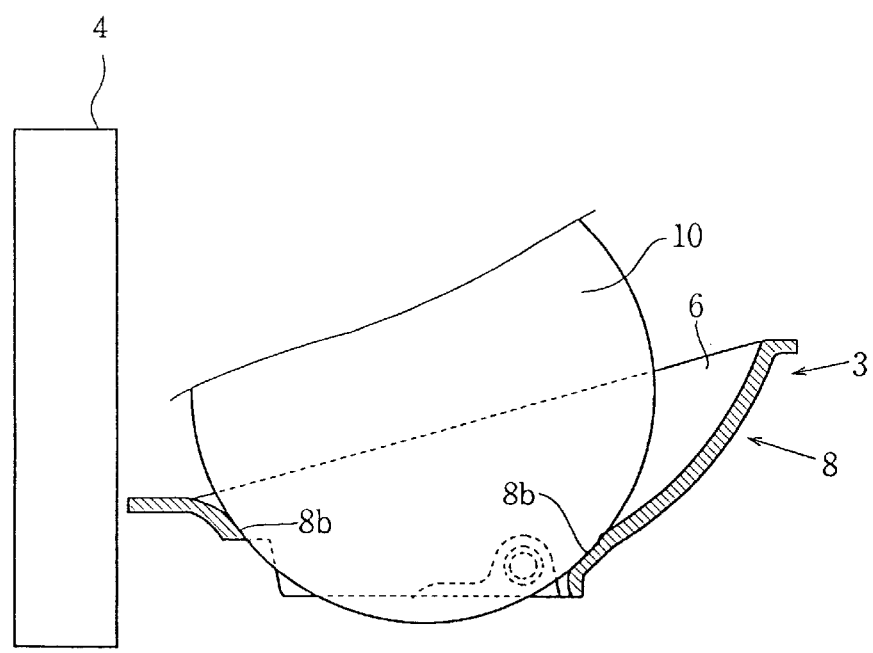
Figure 4:
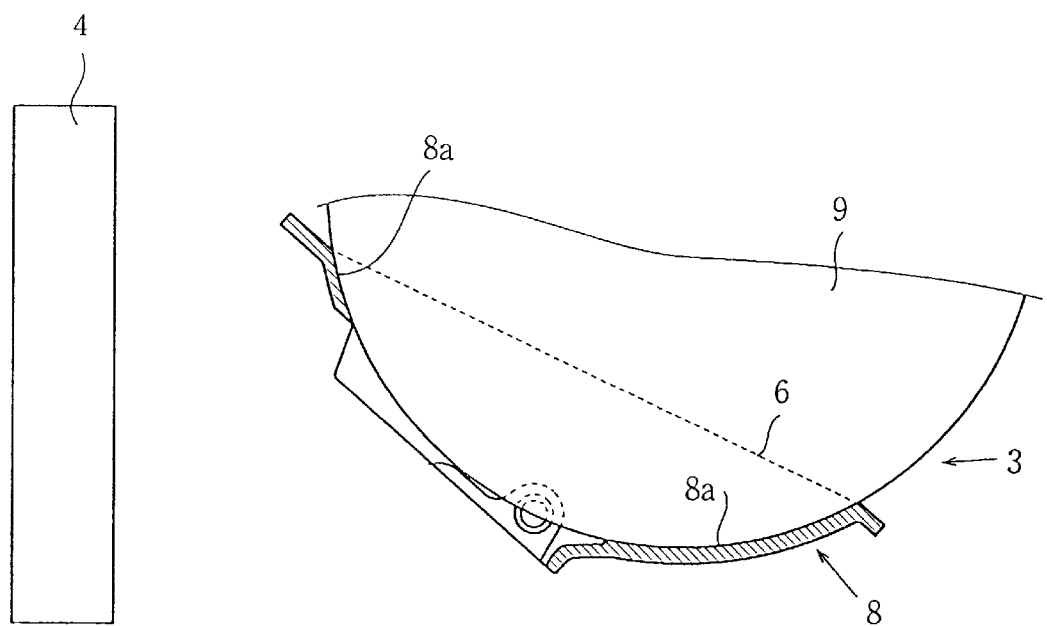
FIGS. 4a and 4b are schematic sectional views of the disc holder in a disc exchanging position, holding the twelve-centimeter disc and the eight-centimeter disc, respectively.
Figure 4:
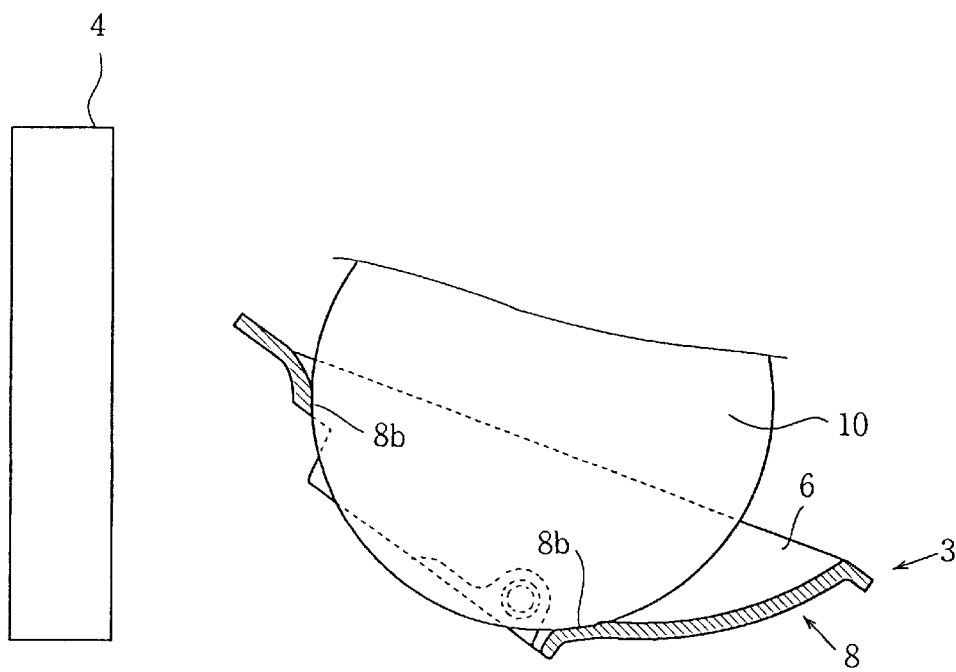

Namely, as shown in FIG. 3a, showing the disc support 8 in a disc storing position, a twelve-centimeter disc 9 is securely held between the front and rear upper portions 8a of the support 8. The disc 9 is kept in the same position even when the support 8 is rotated to a disc exchanging position shown in FIG. 4a.

Referring to FIG. 3b, in a case where an eight-centimeter disc 10 is stored in the support 8, a part of the disc 10 is snugly held in the lower portions 8b of the support 8. Thus, the disc 10 does not roll in the support 8 although the holder 3 is rotated to the disc exchanging position shown in FIG. 4b.

Hence, any disc, regardless of the size, can be loaded in the disc holder 3 at random. The discs thus can be quickly loaded or taken out to be exchanged so that operations following thereto, such as the reproduction of the disc, can be swiftly carried out. Moreover, the discs can be securely supported in the holder 3 despite external shocks and vibrations.

Figure 5:
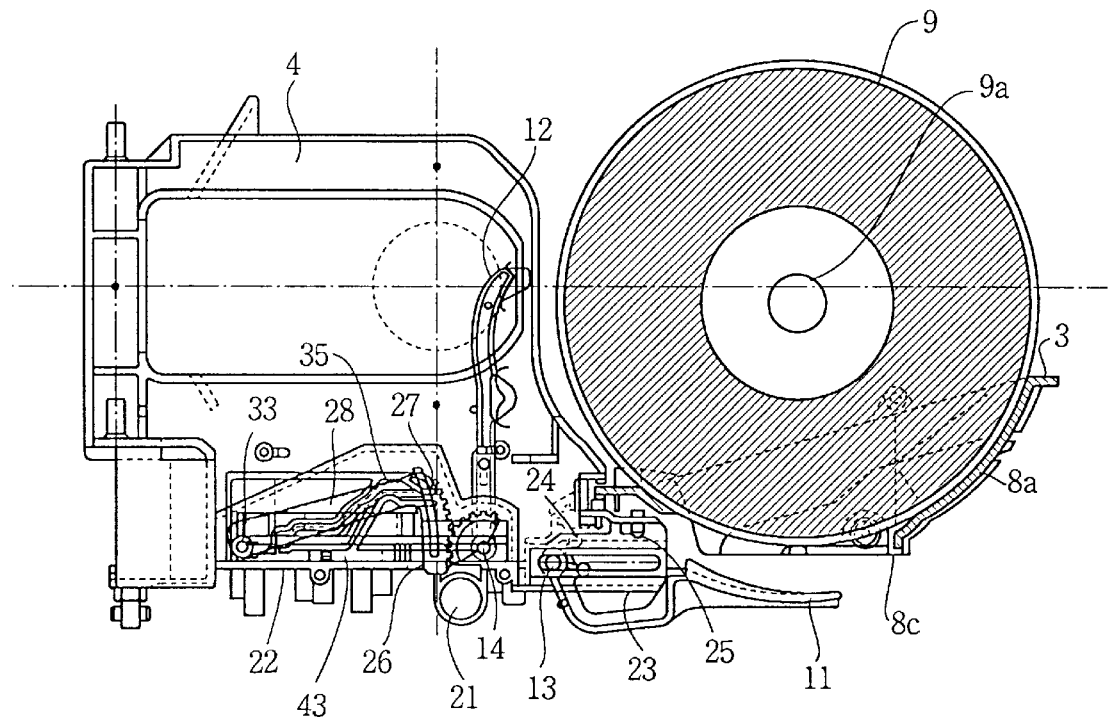
FIGS. 5 to 10 are elevational views of the disc reproducing device, showing the operation thereof when a twelve-centimeter disc is selected.

Referring to FIG. 5, the disc player 4, having a pickup, turntable and other devices for playing the discs, is slidably mounted on a longitudinal guide shaft 21 which is secured to the underside of a base plate 22 of the disc player 4, and disposed in parallel to the axial direction of the disc holder 3. The disc player 4 is moved on the shaft 21 by a driving means (not shown) so as to face a desired disc 9.

The disc player 4 is provided with a loading device for taking out one of the discs 9 from the disc holder 3 and loading it on the disc player 4. The loading device comprises a first arm 11 rotatably mounted on a pivot 13 and a second arm 12. The second arm 12 has a shaft 14 which is rotatably mounted on the base plate 22. Both of the pivots 13 and 14 are disposed at positions lower than the array of discs.

A sliding member 23 is slidably mounted on the base plate 22 so as to be moved in the lateral direction with respect to the shaft 21. The first rotatable arm 11 has an actuating arm 24 which is abutted on a projection 25 of the sliding member 23.

A pinion 26 is secured to the shaft 14, and a sector gear 27 is engaged with the pinion 26. The sector gear 27 is provided on the end of an arm 28 which is rotatably mounted on the base plate 22 by a pivot 33.

A bifurcated cam groove 35 is provided on a sliding plate 43 slidably mounted on the base plate 22. The cam groove 35 is divided into a lower groove 36 and an upper groove 38 at a bifurcation 37. A projected pin (not shown) on the sector gear 27 is slidably engaged with the cam groove 35.

When not in motion, the first rotatable arm 11 is extended under the disc holder 3 while the second rotatable arm 12 stands upright inside the disc player 4. When rotated, the first arm 11 is adapted to enter the opening 8c formed in the disc support 8 of the disc holder 3.

The operation of the disc reproducing device when the twelve-centimeter discs 9 are stored in the disc holder 3 is now described.

Figure 6:
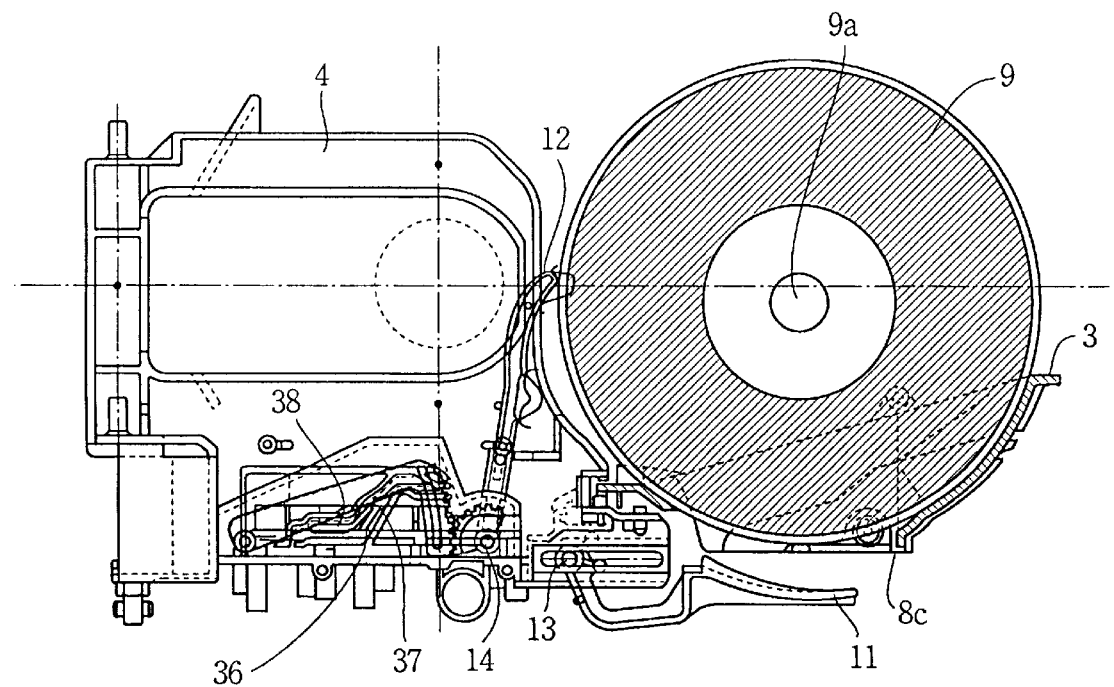

Referring to FIG. 5, when there is a loading command, the disc player 4 slides on the guide shaft 21 and stops in front of a desired disc 9. The sliding plate 43 is moved to the right, so that the arm 28 is rotated in the counterclockwise direction by the upward slope of the cam groove 35. Accordingly, the second rotatable arm 12 is rotated in the clockwise direction as shown in FIG. 6 by the sector gear 27 until the bifurcated tip end thereof abuts against the periphery of the disc 9.

Figure 7:
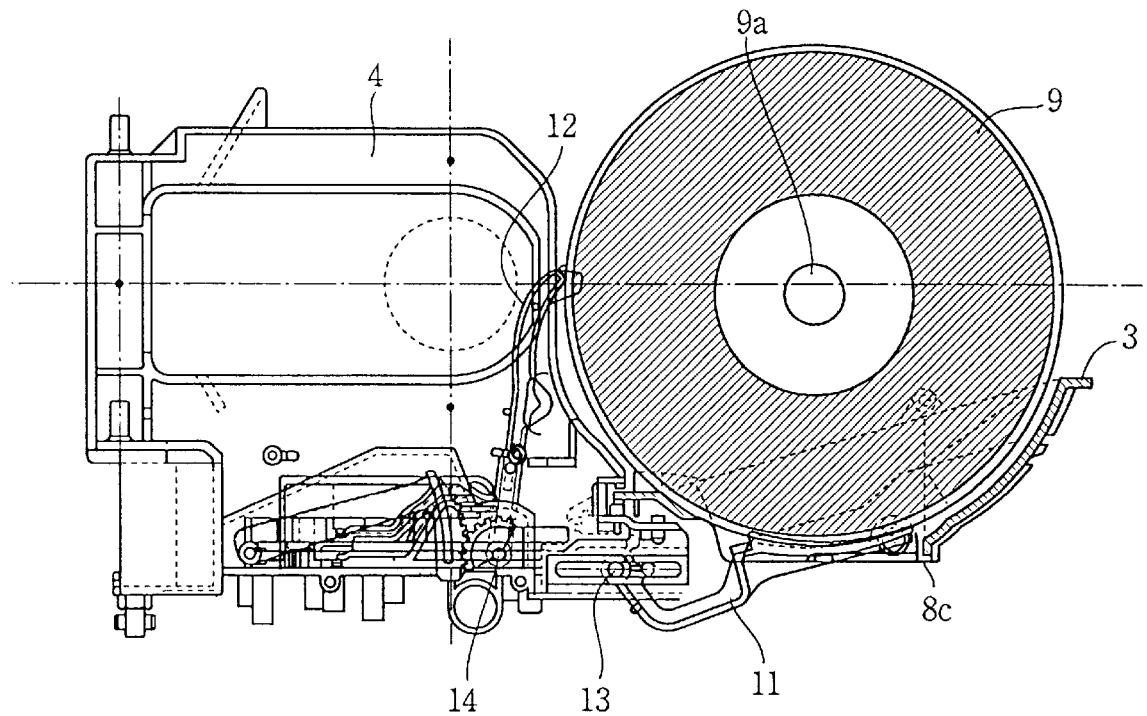
Figure 8:
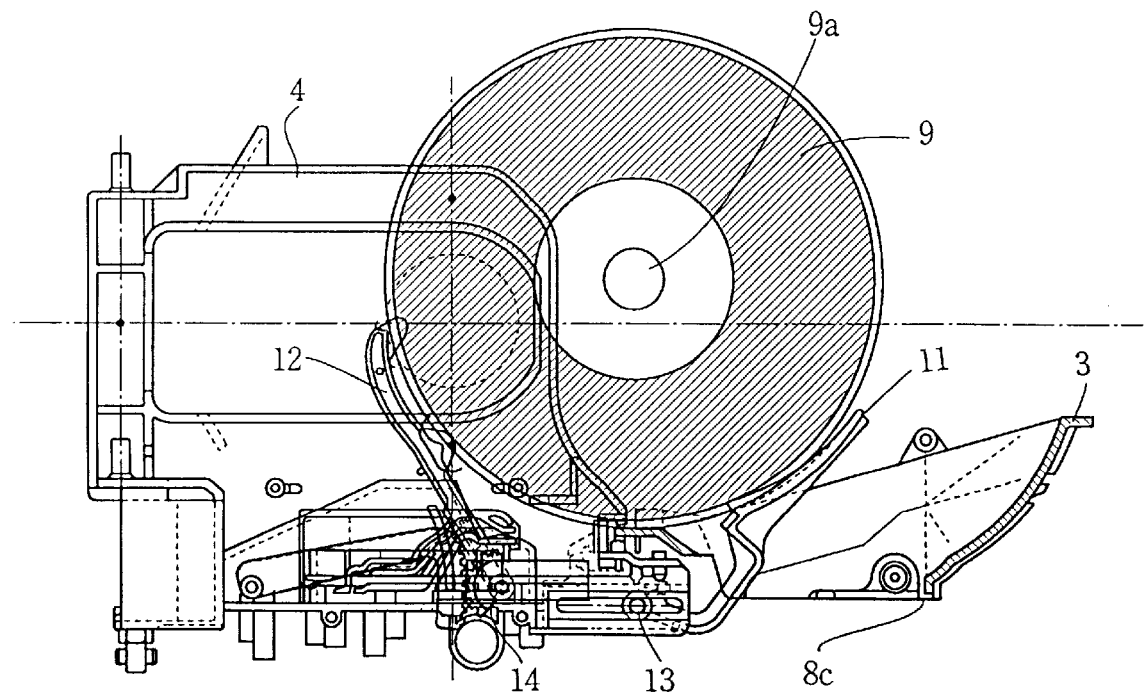
Figure 9:
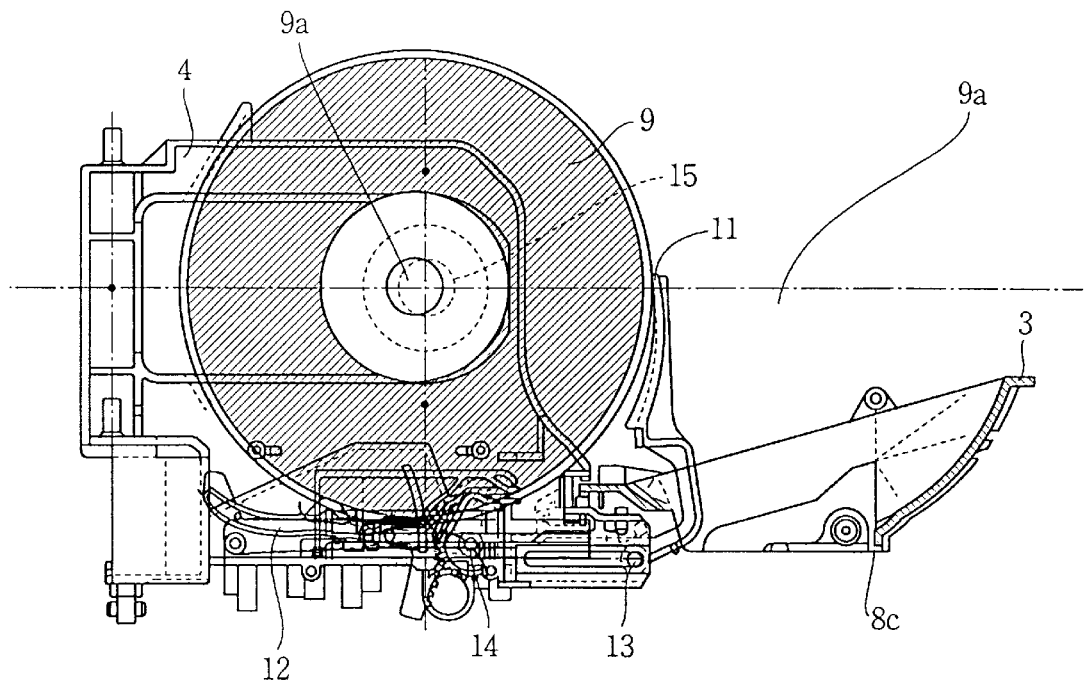

Thereafter, the sliding member 23 is moved to the left, so that projection 25 pushes the arm 24. Accordingly, the first arm 11 is rotated in the counterclockwise direction so as to enter the opening 8c as shown in FIG. 7. Hence the abutting portion 32 engages with the periphery of the disc 9. The first arm 11 is further rotated, the disc is released from the rear portion of the support 8 of the disc holder 10. On the other hand, the sliding plate 43 is further moved to the right, so that the gear 27 is rotated in the clockwise direction by the downward slope of the lower groove 36. Thus, the second arm 12 is rotated in the counterclockwise direction. As shown in FIG. 8, the first and second arms 11 and 12 are further rotated in the counterclockwise direction, thereby engaging the disc 9 with the second arm 12. The disc 9 is accordingly gripped by the first and second arms 11 and 12. The arms 11 and 12 are rotated to carry the disc 9 into the disc player 4 and reach a clamping position shown in FIG. 9.

Figure 10:
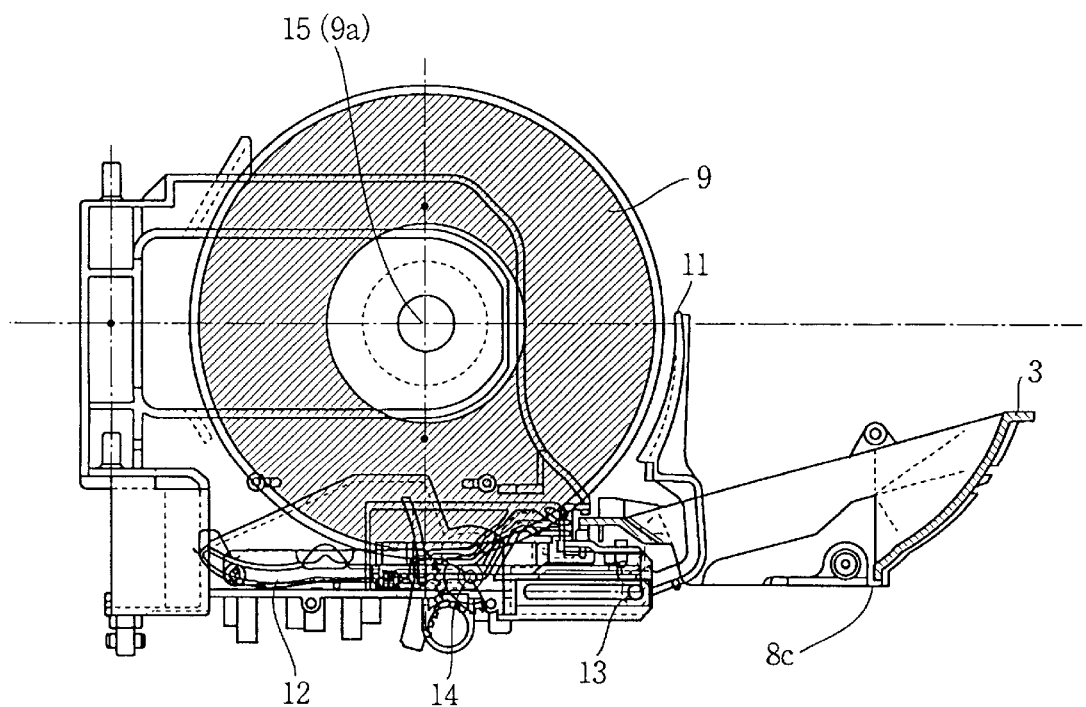

A spindle 15 of a turntable is engaged with a center hole 9a of the disc 9 by a centering member (not shown) provided on the turntable as shown in FIG. 10. Hence the disc is carried to a playing position. At this time, the disc 9 is slightly raised by a taper periphery of the turntable so that the disc is released from the second arm 12. The first arm 11 and the second arm 12 may be slightly rotated to release the disc 9. Thus the disc 1 is ready for reproduction.

The above described operation is carried out in reverse when the disc 9 is put back in the holder 3.

A similar operation of the disc reproducing device when playing the eight-centimeter disc 10 is described hereinafter with reference to FIGS. 11 to 16.

Figure 11:
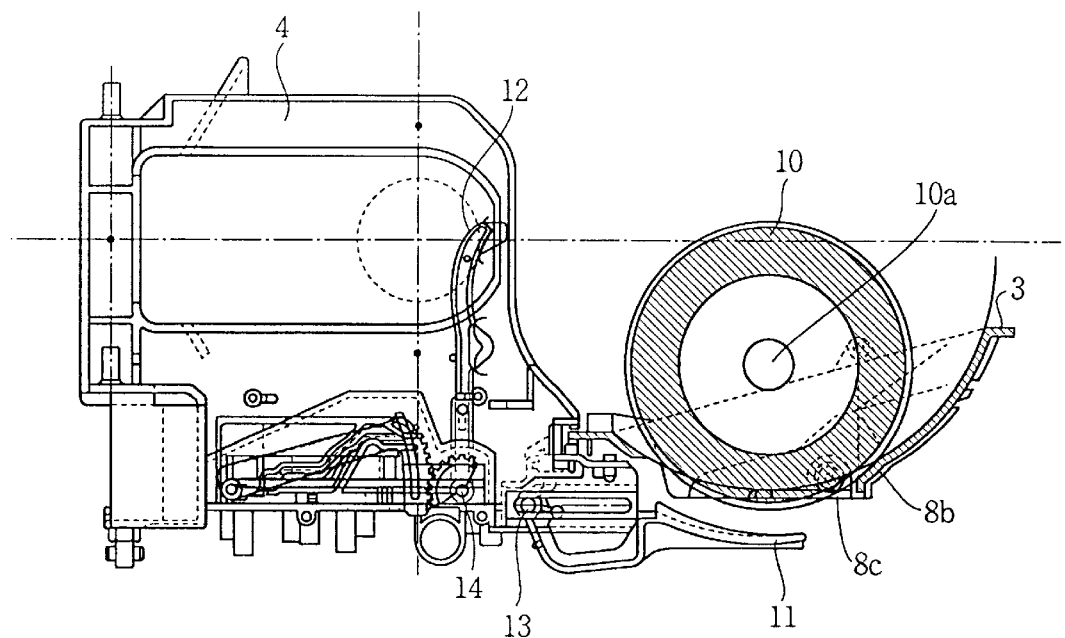
FIGS. 11 to 16 are elevational views of the device, showing the operation thereof when an eight-centimeter disc disc is selected.

Referring to FIG. 11, each disc 10 stored in the disc holder 3 rests on the lower portion 8b of the support 8. The first and second arms 11 and 12 are at the same starting position as the operation for the large disc 9 shown in FIG. 5.

Figure 12:
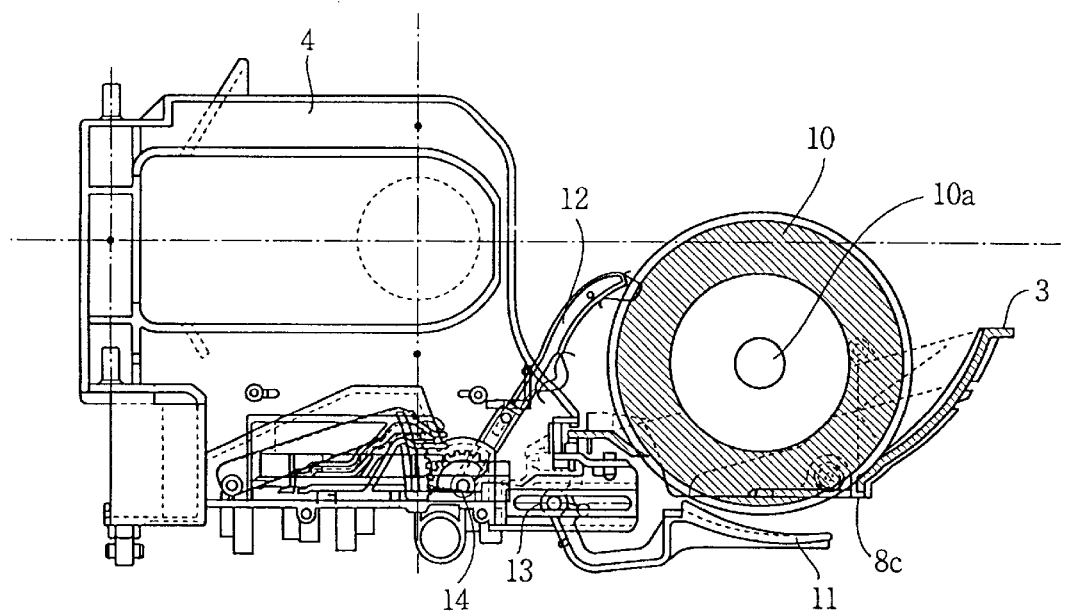

The disc player 4 is moved to a desired position in accordance with the loading command. The second rotatable arm 12 is rotated in a clockwise direction as shown in FIG. 12 until the tip end thereof abuts against the periphery of the disc 10. Since the disc 10 is smaller than the disc 9, the position of the second arm 12 differs from that shown in FIG. 6. Thus the pin on the sector gear 27 engages with the uppermost inside wall of the cam groove 35.

Figure 13:
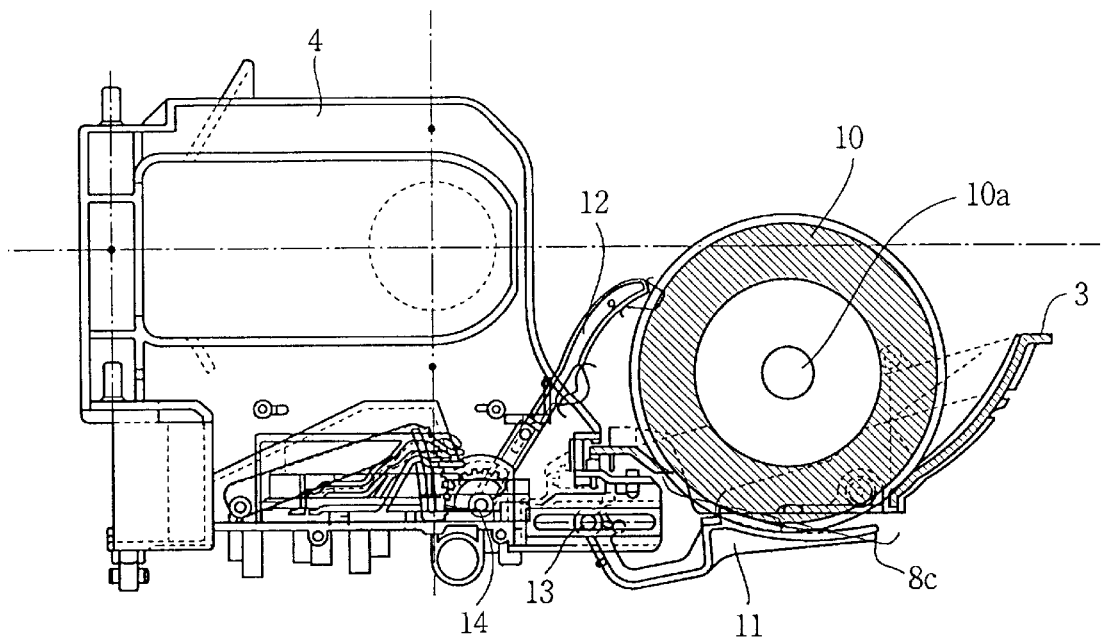
Figure 14:
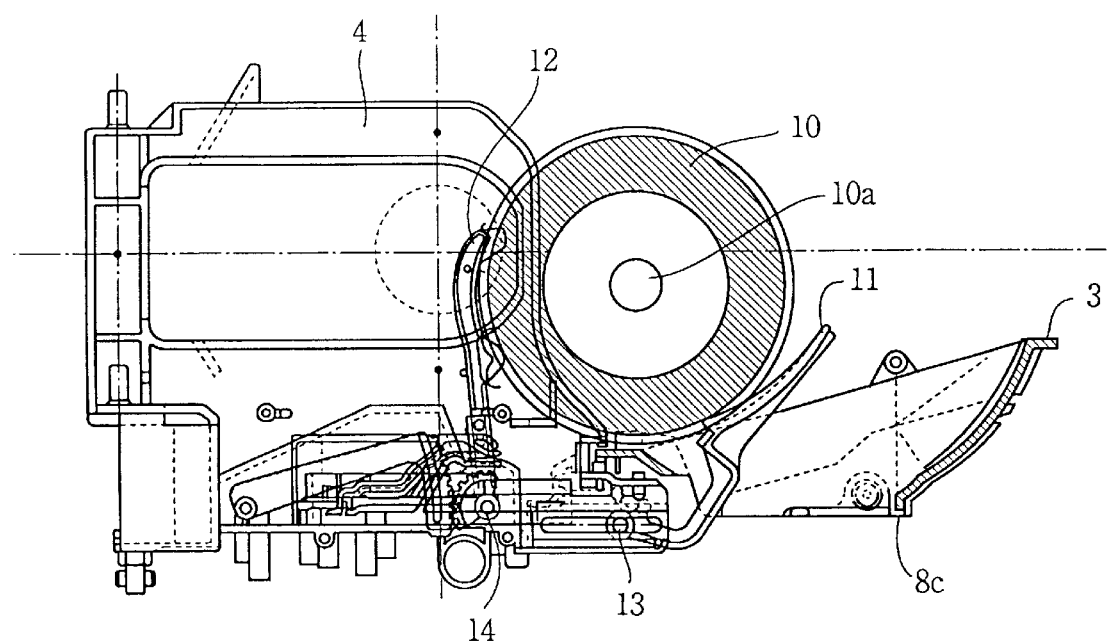

The first arm 11 is thereafter rotated in the counterclockwise direction so as to enter the opening 8c as shown in FIG. 13. The disc 10 is accordingly supported by the arm 11. When the first arm 11 is further rotated, the disc 10 is released from the rear portion of the support 8 of the disc holder 3. As shown in FIG. 14, as the first arm 11 is further rotated in the counterclockwise direction, the second arm 12 is also rotated in the counterclockwise direction, thereby engaging the disc 10 with the second arm 12. The disc 10 is accordingly gripped by the first and second arms 11 and 12. At that time, the pin of the gear 27 engages with the upper groove 38.

Figure 15:
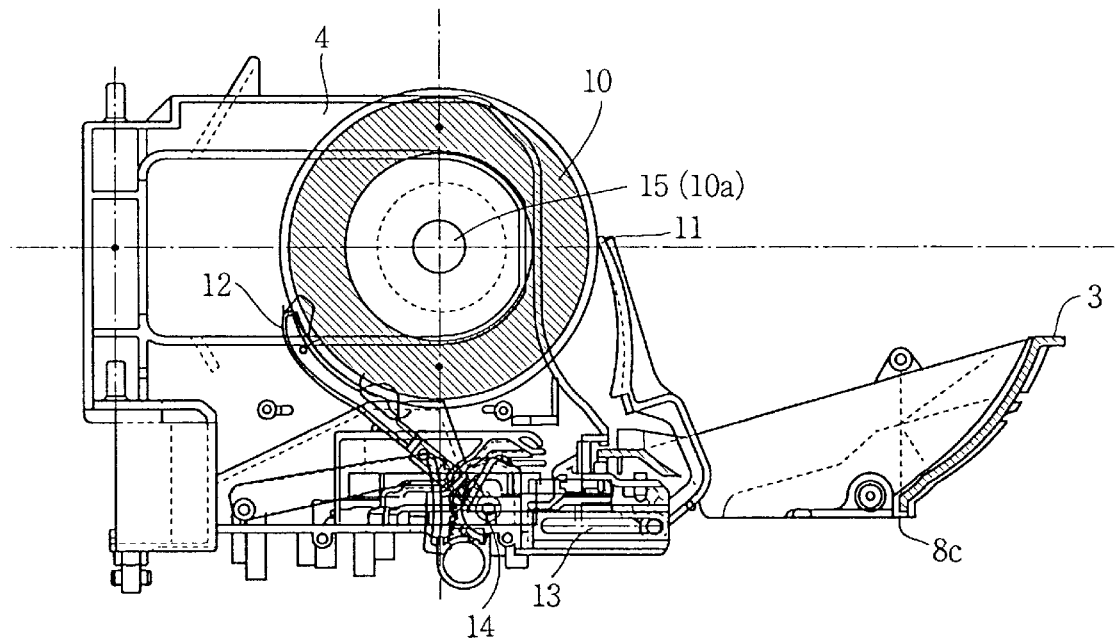
Figure 16:
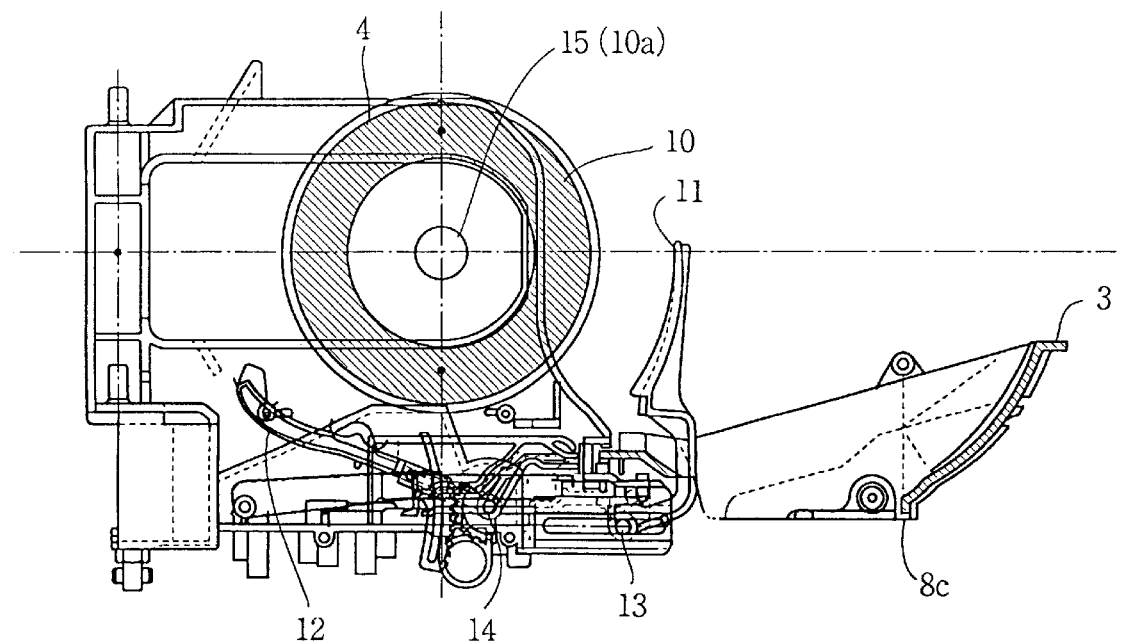
Figure 17:
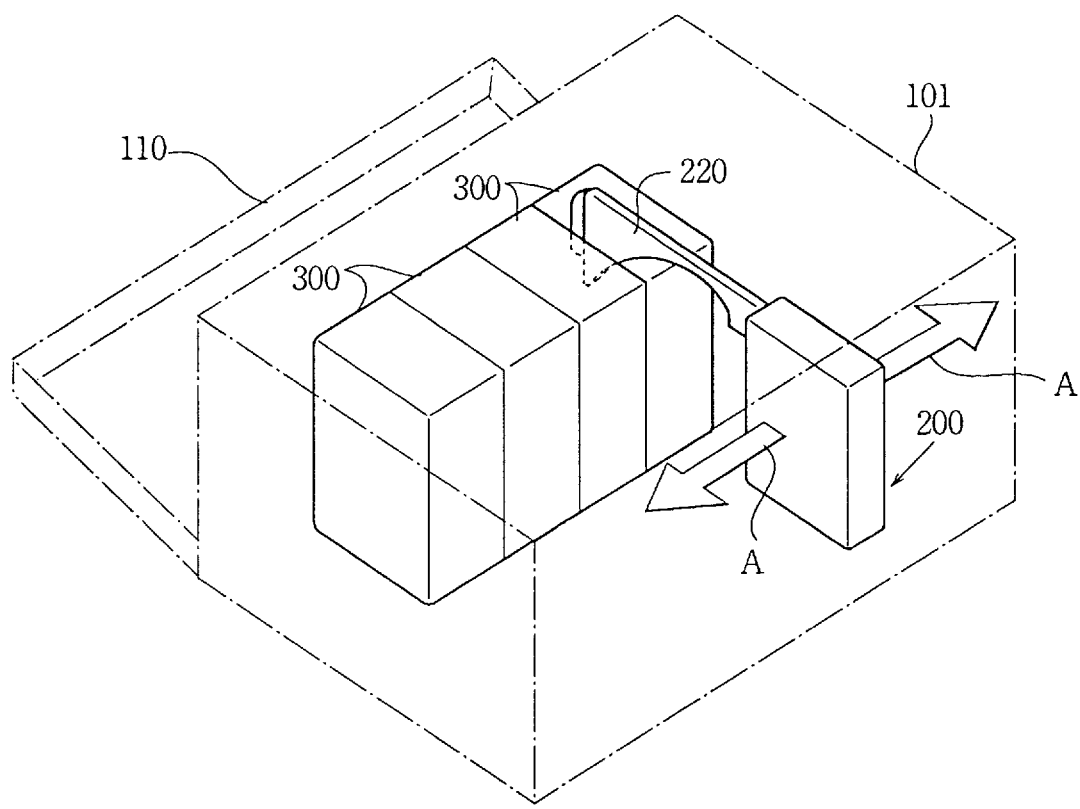
FIG. 17 is a schematic perspective view of a conventional disc reproducing device.
Figure 18:
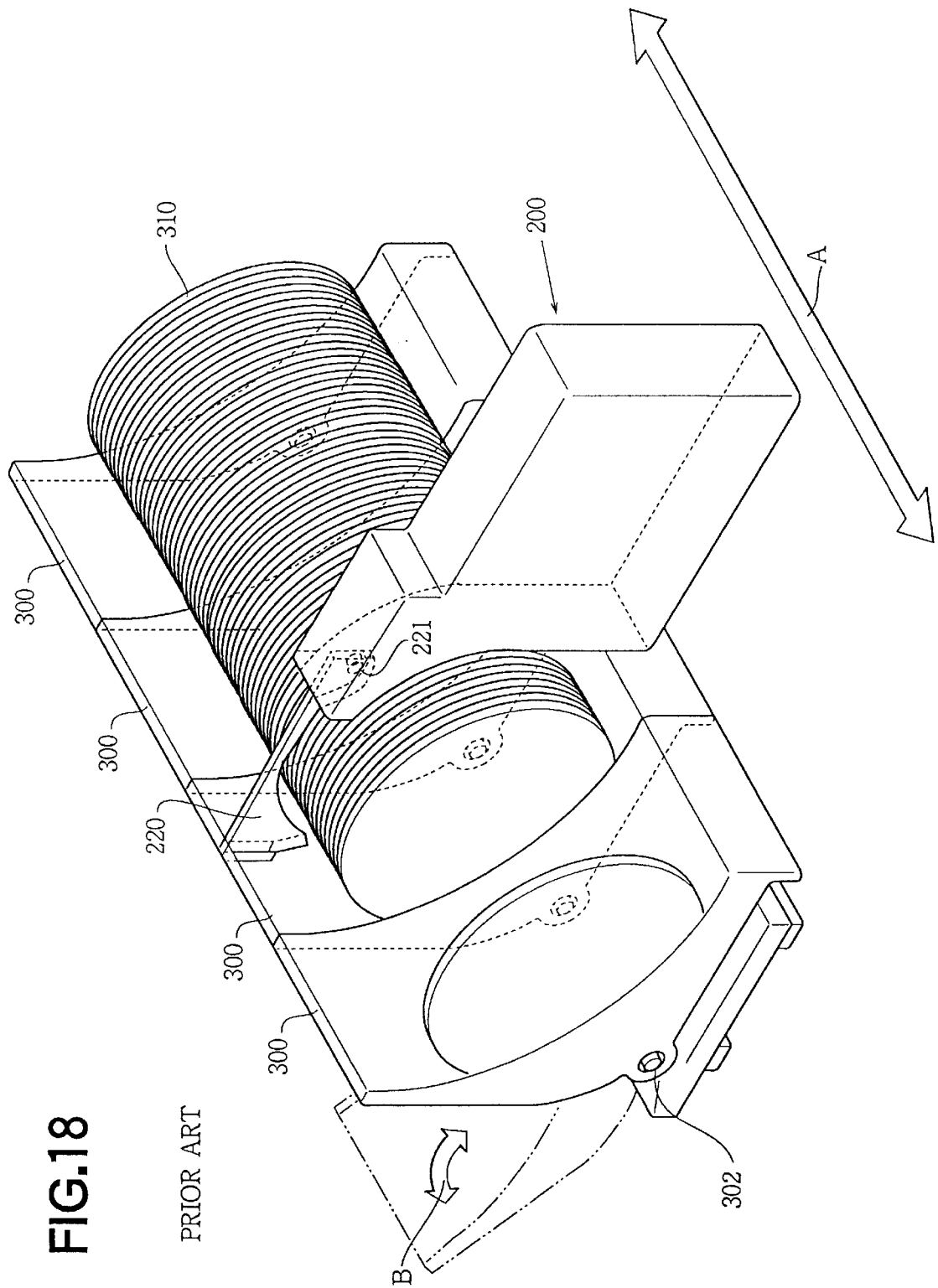
FIG. 18 is a perspective view of a disc holder provided in the disc reproducing device of FIG. 17.
Figure 19:
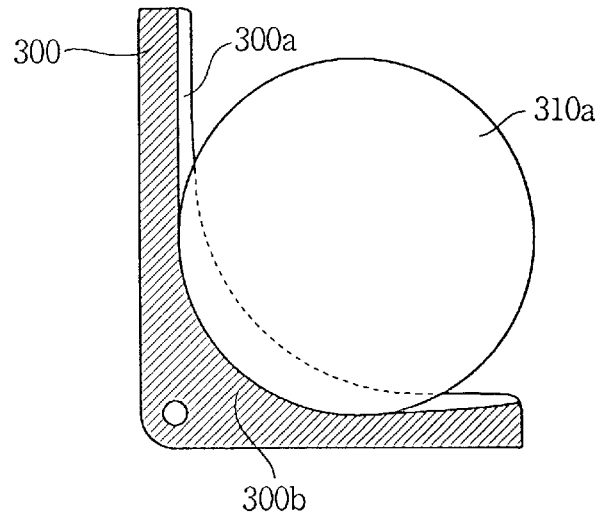
FIGS. 19a and 19b are sectional views of the disc holder of FIG. 18, holding the twelve-centimeter disc and the eight-centimeter disc, respectively.
Figure 19:
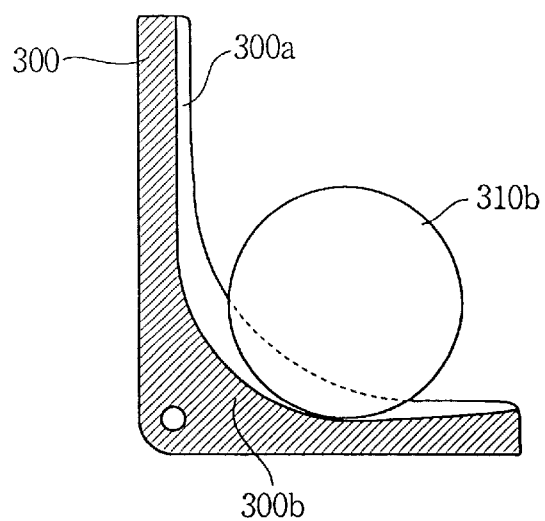
Figure 20:
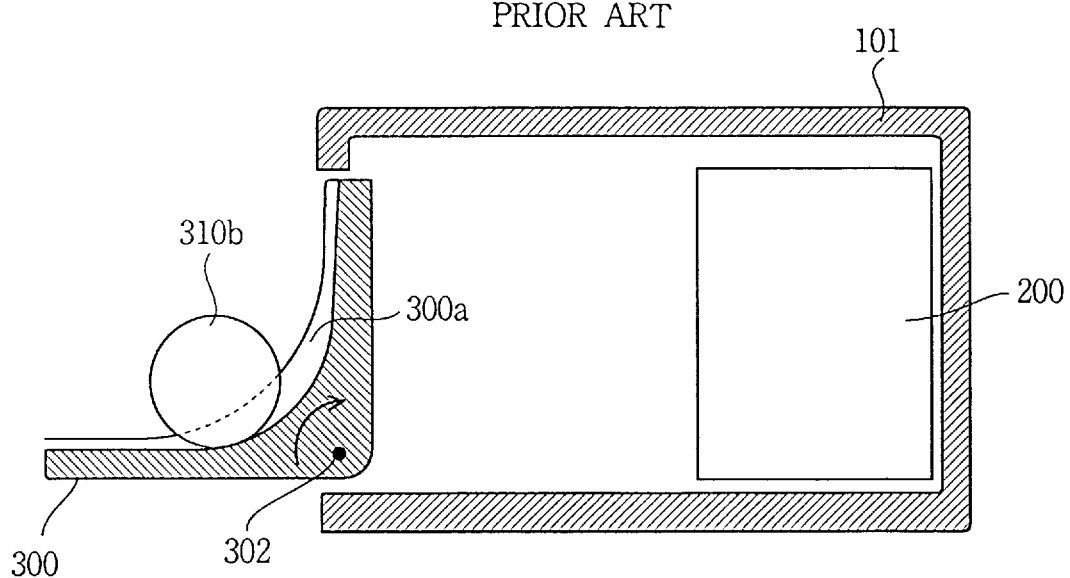
FIGS. 20a and 20b are sectional views of the conventional disc reproducing device storing the eight-centimeter disc when the disc holder is in a disc exchanging position and in a disc storing position, respectively.
Figure 20:
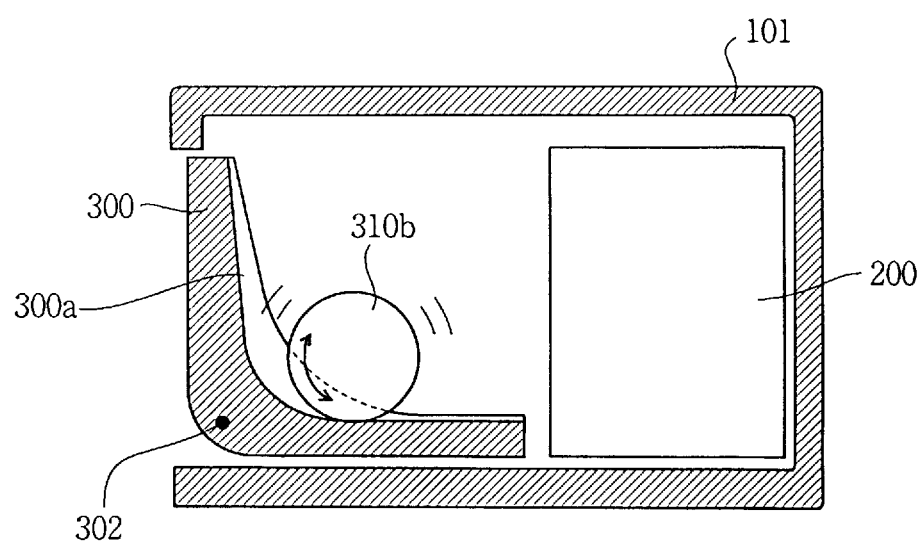

The arms 11 and 12 are further counterclockwisely rotated as they grip and carry the disc 10 to the clamping position in the disc player 4 as shown in FIG. 15. As shown in FIG. 16, a center hole 10a of the disc 10 is thereafter engaged with the spindle 15 of the turntable of the disc player 4 by the centering member, thereby releasing the disc 2 so as to be reproduced. The first and second arms 11 and 13 may be rotated.

From the foregoing it will be understood that the present invention provides a disc holder having a support portion comprising upper portions, the curvature of which correspond to the curvature of the periphery of a twelve-centimeter disc, and lower portions integral with the upper portions, the curvature of which correspond to the curvature of an eight-centimeter disc. The lower periphery of a part of a twelve-centimeter disc fits in the upper portion. When storing an eight-centimeter disc, the disc rolls along the upper portion of the holder until a part of the lower periphery of the disc smoothly engages with the lower portion. Thus, the discs of different sizes can be quickly and securely supported in the disc holder at random, thereby allowing the disc reproducing device to swiftly proceed to an operation for reproducing the disc.

While the invention has been described in conjunction with preferred specific embodiment thereof, it will be understood that this description is intended to illustrate and not limit the scope of the invention, which is defined by the following claims.

What is claimed is:

1. A disc holding device for a disc reproducing device having a disc holder in which a plurality of discs are horizontally arranged, each in a vertical disposition between opposite partitions, a disc player provided to be moved in parallel to an axial direction of the discs, and a loading device for taking out one of the discs from the disc holder and loading it on the disc player,:

wherein the disc holder comprises a support portion with arcuate portions, and wherein the arcuate portions comprise opposite upper portions having a curvature which is substantially equal to that of a larger disc, and opposite lower portions having a curvature which is substantially equal to that of a smaller disc, whereby the larger disc is held by the upper portions, and the smaller disc is held by the lower portions, and wherein the curvature of the lower portions is substantially different than the curvature of the upper portions wherein the curvature of the upper portion of each side of the disc holder and the curvature of the lower portion of each side of the disc holder intersect at a junction defining the differences in curvature between the upper portion and the lower position of each side of the disc holder of the disc holding device, whereby the upper portion and lower portion of each side of the disc holder are continuously formed.

2. The disc holding device according to claim 1 wherein the support portion has an opening between the arcuate portions.

3. The disc holding device according to claim 1 wherein the upper portion and the lower portion of each side of the disc holder are continuously formed at a junction thereof.

4. The disc holding device according to claim 1 wherein the disc holder is rotatably mounted on a horizontal shaft so as to be moved to a disc exchange position outside the disc reproducing device.

* * * * *